United States Patent [19]

Biondetti

[11] 4,047,273
[45] Sept. 13, 1977

[54] DEFLECTION COMPENSATING ROLL
[75] Inventor: Mario Biondetti, Schio, Italy
[73] Assignee: Escher Wyss Limited, Zurich, Switzerland
[21] Appl. No.: 738,561
[22] Filed: Nov. 3, 1976
[30] Foreign Application Priority Data
  Nov. 5, 1975 Switzerland .............. 14255/75
[51] Int. Cl.² .............................. B21B 13/02
[52] U.S. Cl. ................................ 29/116 AD
[58] Field of Search ...... 29/116 AD, 113 AD, 116 R, 29/113 R

[56] References Cited
U.S. PATENT DOCUMENTS

| 3,119,324 | 1/1964 | Justus | 29/116 AD X |
| 3,336,648 | 8/1967 | Alexeff | 29/113 AD |
| 3,389,450 | 6/1968 | Robertson | 29/116 AD |
| 3,802,044 | 4/1974 | Spillman et al. | 29/113 AD |
| 3,879,827 | 4/1975 | Lehmann | 29/116 AD |
| 3,885,283 | 5/1975 | Bionetti | 29/116 AD |
| 4,007,522 | 2/1977 | Holol et al. | 29/116 AD |

Primary Examiner—Alfred R. Guest
Attorney, Agent, or Firm—Pennie & Edmonds

[57] ABSTRACT

A deflection compensating press roll is disclosed in which a stationary beam has a barrel mounted for rotation thereabout and a plurality of hydrostatic elements provide selective hydrostatic support along the length of the roll. The support elements are arranged in a plurality of groups to which hydrostatic pressure fluid is directed at selected pressures through pressure fluid paths which are facilitated by separate hydrostatic fluid ducts.

10 Claims, 5 Drawing Figures

DEFLECTION COMPENSATING ROLL

BACKGROUND OF THE INVENTION

1. Field of the Invention

This invention relates to deflection compensating press rolls of the type having a stationary bearer and a roll shell for rotation thereabout. The shell is supported on a number of hydrostatic support elements disposed in a row. The support elements are subdivided into predetermined numbers of groups to which hydrostatic pressure fluid is fed at different pressures through ducts in the bearer.

2. Description of the Prior Art

Deflection compensating rolls have been used to apply pressure to webs of material, such as paper. For example, Swiss Pat. No. 514,088, or the corresponding U.S. Pat. No. 3,802,044 to Spillmann et al. discloses a roll having bores in the bearer thereof associated with the individual hydrostatic support elements, and pressure fluid is supplied to these elements through the bores.

To produce a relatively large number of bores in the bearer, or beam, is a relatively expensive process. In addition, an excessive number of bores in the bearer greatly weakens the bearer. Also, when the support elements are combined into groups to which the pressure fluid is fed at given pressure through a common bore in each case, it is extrememly difficult or impossible to change the groups. I have invented a deflection compensating press roll in which the ducts can be provided at relatively low cost while avoiding the disadvantages of the prior art and reducing substantially the stresses on the bearer. My invention also provides efficient means for replacement and rearrangement of the groups of ducts of the bearer.

SUMMARY OF THE INVENTION

The invention relates to a deflection compensating press roll which comprises a stationary axial support beam having a central bore extending therethrough, a roll shell rotatably disposed about the support beam ot rotate thereabout, a plurality of hydrostatic support elements positioned in engaged relation between the beam and the shell to exert forces therebetween, and a plurality of coaxial ducts disposed in the central bore of said axial support beam, the ducts capable of transmitting hydrostatic pressure fluid therethrough to feed the hydrostatic support elements, each of the ducts having apertures selectively positioned for entry and exit of hydrostatic pressure fluid. The invention comprises means to selectively direct hydrostatic pressure fluid to the ducts for feeding the hydrostatic support elements with the fluids, and sealing means selectively disposed in engaged relation with the coaxial ducts to define a plurality of separate and distinct sealed hydrostatic pressure fluid paths, each sealed hydrostatic pressure fluid path being associated in communicating relation with a group of at least one hydrostatic support element such that the hydrostatic pressure fluid directed to each group of said elements is independently selectable. Each hydrostatic support element preferably comprises a piston/cylinder combination which is operable by hydraulic pressure fluid.

In the deflection compensating press roll of the invention, ducts are formed by coaxial tubes which are positioned in a bore in the support beam (or bearer) and which are provided with sealing points for mutual sealing and for sealing from the wall of the bore. Predetermined numbers of the tubes are provided with entry and exit apertures for the pressure fluid to enter and exit.

To form such coaxial ducts, a single bore of relatively large diameter must be formed in the beam. The tubes forming the ducts are simple inexpensive elements which can be removed from the bearer and readily replaced when so desired. This procedure allows the groups of support elements to be changed for a given roll with a minimum of difficulty.

Preferably, at each of the sealing points, a pair of telescopically slidable parts is provided as a support means for resilient sealing ring. Each of these parts has inclined facing surfaces such that the two together form a V-shaped groove for a sealing ring of circular cross section. The outside diameter of the sealing ring in an unstressed conditon is less than the outside diameter of the slidable parts and the inside diameter of the groove selected such that when the inclined surfaces are spaced apart the outside diameter of the ring disposed in the groove is also less than the outside diameter of the telescopic parts. With this construction, it is possible to introduce the tubes with the seals into the bearer bore without any risk of damage of the seals by possibly sharp edges of the connecting bores leading from the central bore to the individual support elements.

The tubular parts are not retracted until the place where the seal is to come into contact, at the sealing ring, is pressed against the wall of the bore.

Preferably, the outer end of the innermost tube has a threaded portion and a threaded member is threadedly secured thereon so as to support the innermost tube with respect to the outermost tube in such manner that the sealings rings at the sealing points may be presses against the inclined surfaces of the grooves and against the wall of the bore in the bearer by retraction of the telescopically slidable parts.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
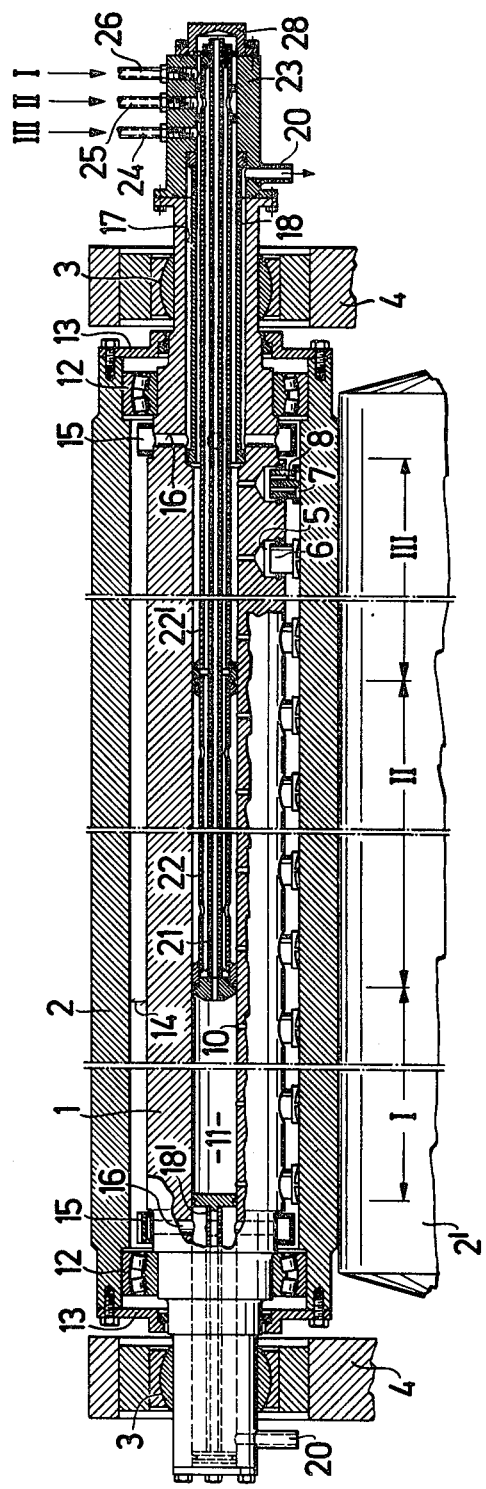
FIG. 1 is an axial cross sectional view of a deflection compensating press roll according to the invention.

FIG. 1 is a cross section of a deflection compensating press roll comprising a stationary bearer 1 and a barrel 2 rotatable about the latter. Bearer 1 is supported in sphercial bearings 3 secured in the frame 4 of press (not shown in detail). The bearer is also secured against rotation relatively to the frame 4 by means such as pins (not shown).

A row of cylindrical bores 5 is formed in the bearer 1 and hydrostatic support elements 6 in the form of pistons are guided therein sealing-tight relationship and so as to be pivotable. As already described in detail in said U.S. Pat. No. 3,802,044, the support elements are provided with hydrostatic bearing pockects 7 and throttle bores 8 which connect the bearing pockets to the cylinder chamber of the associated bore 5. The cylindrical bores 5 are connected by connecting bores 10 to a central bore 11 in the bearer 1 intended for the supply of hydraulic pressure fluid, such as oil, to the individual bores 5 and support elements 6. In known manner, the operative cross-sectional areas of the pockets 7 are larger than the surfaces subjected to the pressure in the bores 5. The barrel 2 cooperates with a co-acting roll 2'.

As will be seen from FIG. 1, the ends of the roll barrel 2 are mouted on the bearer 1 in roller bearings 12. Alternatively, guides may be provided as disclosed, for example, in U.S. Pat. No. 3,855,283. Cover plates 13 are also provided at the ends of the barrel 2 to seal off the intermediate space 14 between the bearer 1 and the barrel 2 from the exterior.

Scoop rings 15 are provided on the bearer 1 either end of the barrel 2 to discharge the hydraulic fluid emerging from the support elements 6 during operation, and to convey the fluid in the intermediate space 14 through transverse bores 16 to an enlarged part 17 of the bore 11, in which part a discharge tube 18 is provided. The hydraulic fluid to be discharged flows out of the bores 16 through the intermediate space between the outer wall of tube 18 and the inner wall of the bore 17, into an outflow conduit 20 which, for example, leads to a tank for the hydraulic fluid.

A discharge tube 18' acting in the same way as the discharge charge tube 18 is diposed at the other end of the bearer 1 in the bore 11.

As will be seen from FIG. 1, the roll support elements 6 are subdivided into these groups I, II, and III, to which hydraulic pressure medium is to be fed at different pressures through separate conduits. According to the invention, to this end, concentric tubes 21, 22 and 22' are provided in the bore 1 and lead out of a connection part 23 into the bore 11 of the bearer and are sealed off therefrom.

Figure 2:
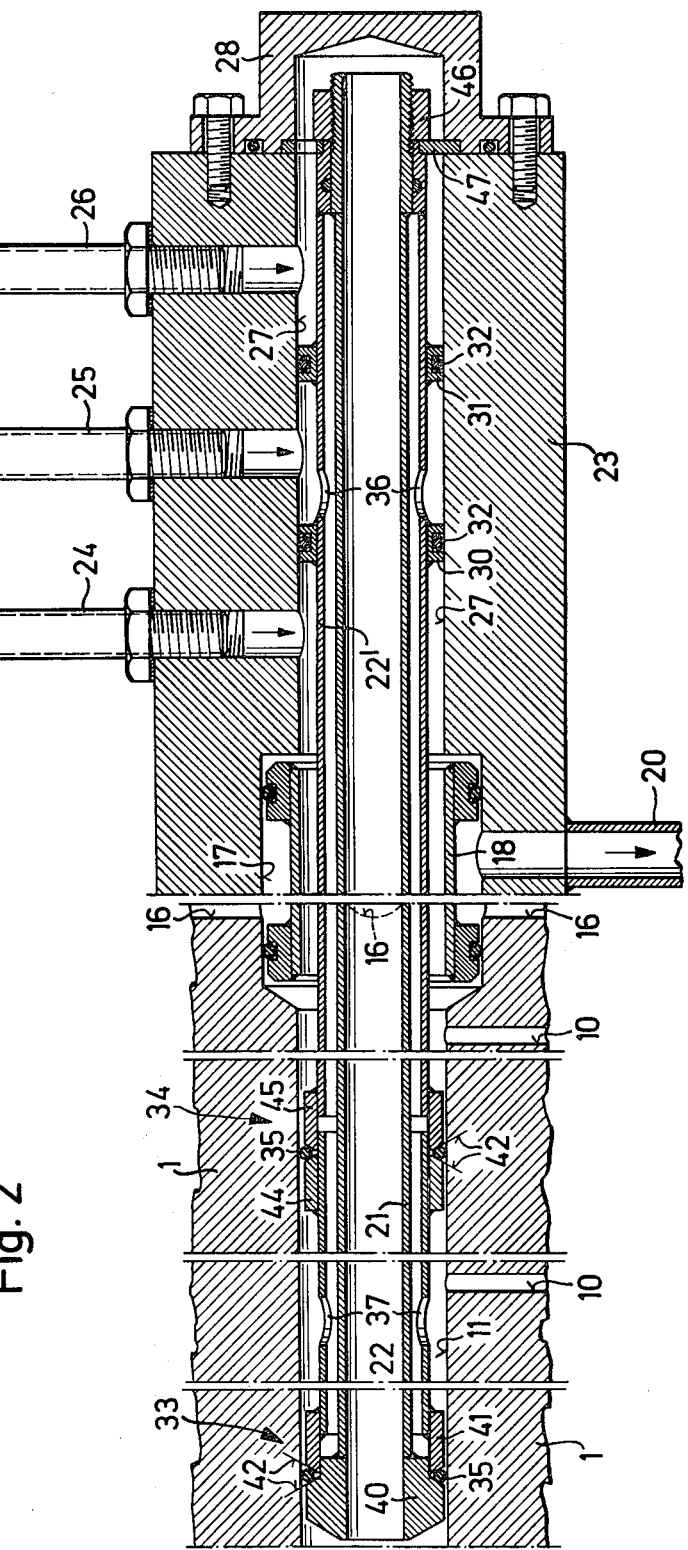
FIG. 2 is an enlarged view of a portion of the press roll of FIG. 1.

As will be seen from FIGS. 1 and 2, pressure conduits 24, 25, and 26 are connected to the connecting part 23 and carry the pressure fluid intended for the groups I, II and III. The bore 27 formed in the connecting part 23 to receive the tubes 21 and 22' is closed from the exterior by a cover 28. Closure rings 30, 31 with sealing rings 32 and closure devices 33, 34 with sealing rings 35 are provided to seal off the intermediate spaces between the tubes 22, 22' and the wall of the bore 11, 27.

As will be apparent from FIGS. 1 and 2, the pressure fluid fed via the conduit 26 flows through that portion of the bore 27 which is on the right of the closure ring 31, into the interior of the tube 21 and through the latter into the section of the bore 11 associated with group I.

The pressure fluid fed via conduit 25 flows into the section of the bore 27 situated between the closure rings 30 and 31 and through apertures 36 in tube 22' into the intermediate space between the tubes 21 and 22, 22'. The pressure fluid finally flow from this intermediate space through aperture 37 in tube 22 into that section of the bore 11 which is situated between the closure devices 33 and 34 and is associated with group II of the support elements 6.

The pressure fluid via conduit 24 finally flows to that portion of bores 11 and 27 which is situated between the closure devices 34 and the closure rings 30 and can be fed from this section directly via the connecting bores 10 to pressure elements 6 of group III.

Figure 3:
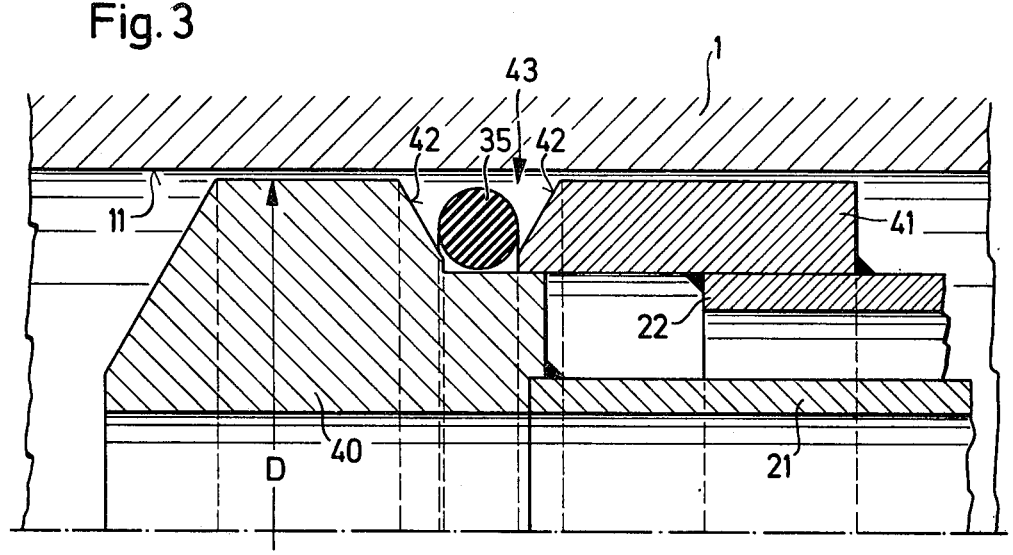
FIG. 3 is an exploded view of a sealing point shown in FIG. 2 with the tubular seal support parts being extended from one another.
Figure 4:
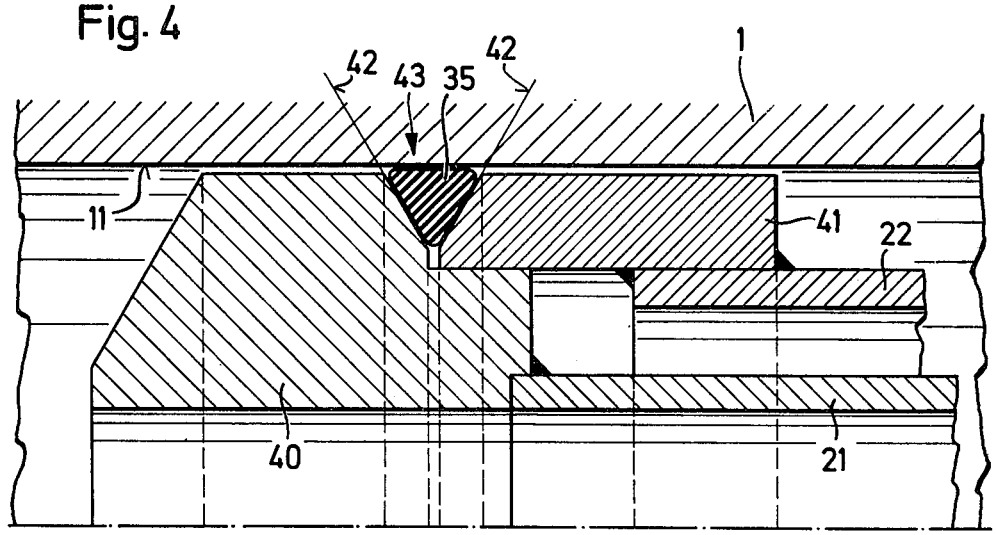
FIG. 4 is an exploded view of a sealing point shown in FIG. 3 with the sealing ring in its operative position.

To avoid damaging the sealing rings 35 when the tubes 21, 22, 22' are introduced into the bore 11, the closure devices 33, 34 are telescopic as will be apparent mainly from FIGS. 2, 3, and 4.

The sealing system 33 consists of a part 40 over which a tubular part 41 is telescopically slideable. Parts 40 and 41 have facing inclined surfaces 42 together forming a V-shaped groove 43 for the sealing ring 35 in its circular cross section state. The sealing ring 35 and the inside diameter of part 41 are so selected that when the parts 40 and 41 are extended from one another the outside diameter of the ring 35 is less than the outside diameter D of the parts 40, 41. However, when the parts 40 and 41 are moved towards one another, the inclined surfaces 42 of these parts abut one another and the groove 43 limited by the surfaces 42 is constricted so that the sealing ring 35 is pressed out and is clamped between the wall of the bore 11 and the surfaces 42. This process is shown in detail in FIGS. 3 and 4.

The closure device 34 having two parts 44 and 45 provided with the inclined surfaces 42 acts in the same way. Part 44 is secured to tube 22 and part 45 to tube 22'.

The movement of the closure devices 33 and 34 towards one another ot press out the sealing rings 35 is effected by means of a screwthreaded ring 46 which is positioned on the right-hand end of the tube 21 and bears against a plate 47 on which the right-hand end of the tube 22' simultaneously bears.

Figure 5:
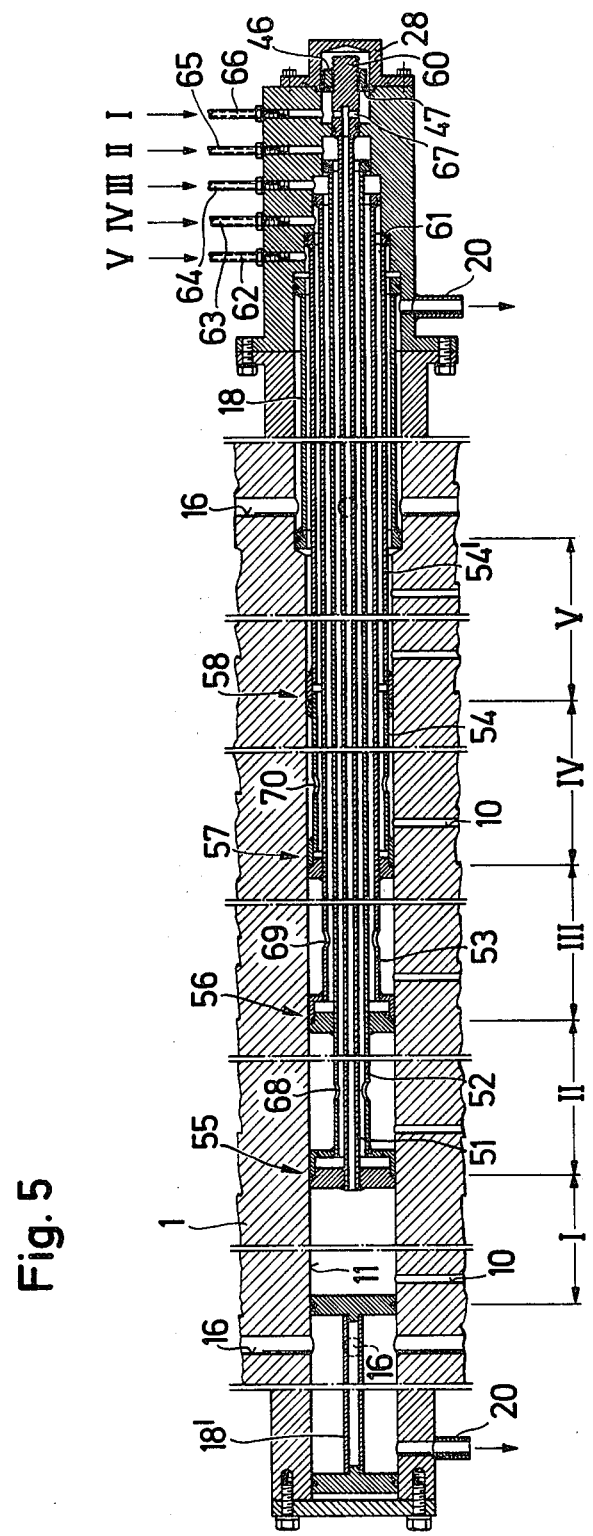
FIG. 5 is an axial cross sectional view showing an alternate embodiment of the deflection compensating press roll having five pressure zones, i.e. five groups of support elements.

FIG. 5 shows an embodiment of the invention for a deflection compensating press roll with 5 groups I-V of hydrostatic support elements.

The drawing is a partial cross section of the bearer and connections corresponding to FIG. 2, those pasts which are equivalent to the embodiment shown in FIGS. 1 and 2 having the saem references.

Referring to FIG. 5 tubes, 51, 52 53, 54 and 54' are disposed in the bore 11 of the bearer 1 in addition to the tube 18 for the discharge of the hydraulic pressure fluid. The individual tubes are separated from one another and from the wall of the bore 11 by closure devices 55, 56, 57 and 58 which act in the same way as the devices 33 and 34 in FIG 2.

The right-hand end of the tube 51 is connected to a screwthreaded part 60, e.g. by a welded joint. The screwthreaded ring 46 is screwed on to the screwthreaded part 60 and bears against the plate 47. The right-hand ends of the other tubes are guided in sealing-tight relationship in stepped bores, the right-hand end of the outer-most tube 54' being borne against a shoulder 61. As will also be seen from FIG. 5, the pressure fluid is fed to the individual groups I-V via associated pressure conduits 62-66. For the entry of the pressure fluid to the tube 51, the screwthreaded part 60 is provided with a transverse bore 67. Bores 68, 69 and 70 allow the pressure fluid to flow out of the tubes 52, 53 and 54.

The arrangement in FIG. 5 acts similarly to that shown in FIGS. 1 and 2. The tubes 51, 52, 53, 54 and 54' are jointly introduced into the bore 11, with thhe parts of the closure devices 55, 56, 57 and 58 being extended from one another as shown in FIG. 3. After the connecting part 23 is fixed in position, the threaded ring 46 is threadedly secured thereto and the parts of the closure devices are moved towards each other until they bear against each other. Finally, the tube 54' is pressed against the shoulder 61, with the line of the contact-pressure forces from the tube 54' to the threaded ring 46 being closed by the connecting part 23.

I Claim:

1. A deflection compensating press roll comprising:
   a. a stationary axial support beam having a central bore extending therethrough;
   b. a roll shell rotatably disposed about said support beam to rotate thereabout;
   c. a plurality of hydrostatic support elements positioned in engaged relation between said beam and said shell to exert forces therebetween;
   d. a plurality of coaxial ducts disposed in the central bore of said axial support beam, said ducts being capable of transmitting hydrostatic pressure fluid therethrough to feed said hydrostatic support elements, each of said ducts having apertures selectively positioned for entry and exit of hydrostatic pressure fluid;
   e. means to selectively direct hydrostatic pressure fluid to said ducts for feeding said hydrostatic support elements with said fluid; and
   f. sealing means selectively disposed in engaged relation with said coaxial ducts to define a plurality of separate of distinct sealed hydrostatic pressure fluid paths, each sealed hydrostatic pressure fluid path being associated in communicating relation with a group of at least on hydrostatic support element such that the hydrostatic pressure fluid directed to each group of said elements is independently selectable.

2. The deflection compensating roll according to claim 1, wherein said sealing means comprises a plurality of resilient sealing rings selectively positioned with respect to said ducts.

3. The deflection compensating roll according to claim 2, wherein said coaxial ducts are formed of a plurality of telescopically slidable tubular members.

4. The deflection compensating roll according to claim 3, wherein each sealing means is positioned within a groove defined by at least one support member associated with each tubular member.

5. The deflection compensating roll according to claim 4, wherein said support means for said sealing rings is comprises of at least two members having faced surfaces which form a V-shaped groove about the associated tubular member to support said sealing ring.

6. The deflection compensating roll according to claim 5, wherein each sealing ring has a generally circular cross section.

7. The deflection compensating roll according to claim 6, wherein the outside diameter of each sealing ring in its unstressed condition is less than the outside diameter of the associated slidable tubular member and the inside diameter of the associated V-shaped groove is so preselected that when the inclined surfaces of each member of said support means are spaced apart, the outside diameter of the sealing ring disposed within said V-shaped groove is correspondingly less than the outside diameter of the tubular member.

8. The deflections compensating roll according to claim 7, wherein the innermost tubular member is supported with respect to the outermost tubular member by a support means threadedly secured thereto in such manner that the associated sealing rings are relatively pressed against their respective inclined surfaces of their support grooves and in relatively compressed relation against a wall portion of said central bore in said support beam of retraction of said telescopically slidable tubular member.

9. A deflection compensating press roll which comprises:
   a. a stationary axial beam having a central bore extending therethrough;
   b. a rotatable roll shell disposed about said beam to move in a free manner in a generally radial direction relative to said beam;
   c. at least three hydrostatic support elements guidably mounted in said beam in a predetermined support plane to rotatably support said shell on said beam and to follow movements of said shell, said supporting elements consituting the sole means to restrict motion of said shell with respect to said beam in said plane;
   d. at least three telescopic coaxial tubular members disposed within said central bore of said axial support beam, said tubular members being adapted to direct hydrostatic pressure fluid therethrough to feed said hydrostatic support elements, each of said tubular members having apertures positioned for entry and exit of hydrostatic pressure fluid;
   e. means to selectively direct hydrostatic pressure fluid to said ducts for feeding said hydrostatic support elements with said fluid; and
   f. resilient fluid sealing rings selectively disposed between pairs of adjacent tubular members to define a plurality of separate and distinct pressure fluid paths in a manner that each fluid path is being associated with a group of at least three hydorstatic support elements such that the hydrostatic pressure fluid directed to each group of said elements is independently selectable.

10. The deflection compensating press roll according to claim 9, further comprising at least four telescopic coaxial tubular members disposed within said bore, said members defining at least five independent pressure fluid paths, each path being associated in fluid communicating relation with at least three hydrostatic support elements.

* * * * *

UNITED STATES PATENT AND TRADEMARK OFFICE
CERTIFICATE OF CORRECTION

PATENT NO. : 4,047,273
DATED : September 13, 1977
INVENTOR(S) : Mario Biondetti

It is certified that error appears in the above-identified patent and that said Letters Patent are hereby corrected as shown below:

Column 1, line 29, "extrememly" should read -- extremely --

Column 1, line 42, "ot" should read -- to --

Column 2, line 24 "damage of the seals" should read -- damage to the seals --

Column 2, line 34, "that the sealings rings" should read -- that the sealing rings --

Column 2, line 34, "may be presses" should read -- may be pressed --

Column 2, line 62, "frame 4 of press" should read -- frame 4 of a press --

Column 3, line 16, "U. S. Patent No. 3,855,283" should read -- U. S. Patent No. 3,885,283 --

Column 3, line 20, "bearer 1 either end" should read -- bearer 1 at either end --

Column 3, line 33, "discharge charge tube 18" should read -- discharge tube 18 --

Column 3, line 36, "into these groups" should read -- into three groups --

Column 4, line 26, "ot press out" should read -- to press out --

Column 4, line 36, "those pasts" should read -- those parts --

UNITED STATES PATENT AND TRADEMARK OFFICE
CERTIFICATE OF CORRECTION

PATENT NO. : 4,047,273
DATED : September 13, 1977
INVENTOR(S) : Mario Biondetti

It is certified that error appears in the above-identified patent and that said Letters Patent are hereby corrected as shown below:

Column 4, line 38, "having the saem references" should read -- having the same references --

Column 4, line 61, "thhe parts" should read -- the parts --

Column 5, lines 23-24, (Claim 1 (f) "of separate of distinct" should read -- of separate and distinct --

Column 5, line 44 (Claim 5) "is comprises of" should read -- is comprised of --

Column 6, line 13, (Claim 8) "of retraction of" should read -- by retraction of --

Column 6, lines 44-45 (Claim 9(f) "hydorstatic support element should read -- hydrostatic support elements --

Signed and Sealed this

Twenty-fourth Day of January 1978

[SEAL]

Attest:

RUTH C. MASON
Attesting Officer

LUTRELLE F. PARKER
Acting Commissioner of Patents and Trademar